March 9, 1954 L. F. ANDERSON ET AL 2,671,478
APPARATUS FOR CUTTING STUMPS
Filed March 16, 1949 5 Sheets-Sheet 1
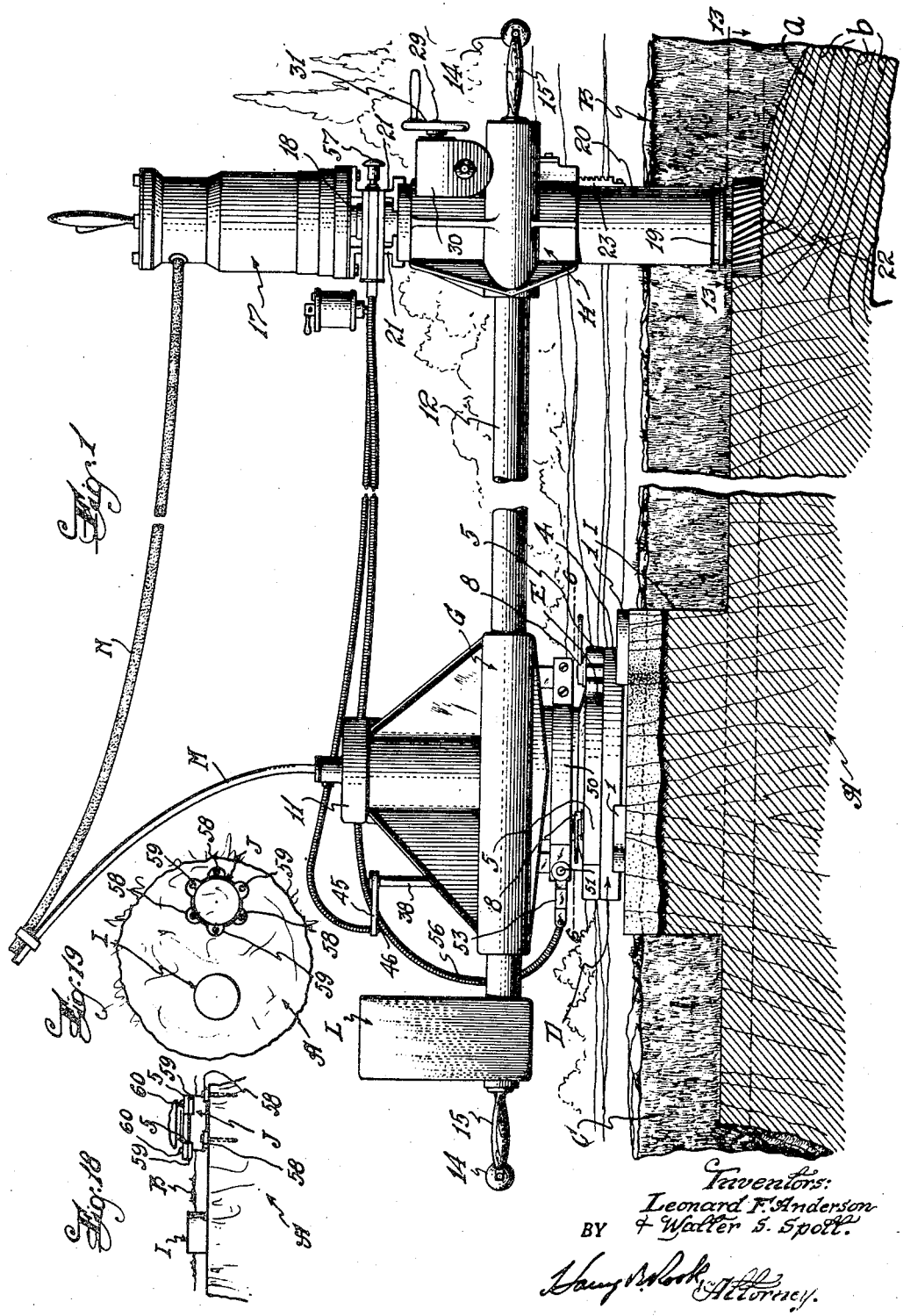
Inventors:
Leonard F. Anderson
& Walter S. Spott
BY
Harry B. Cook
Attorney

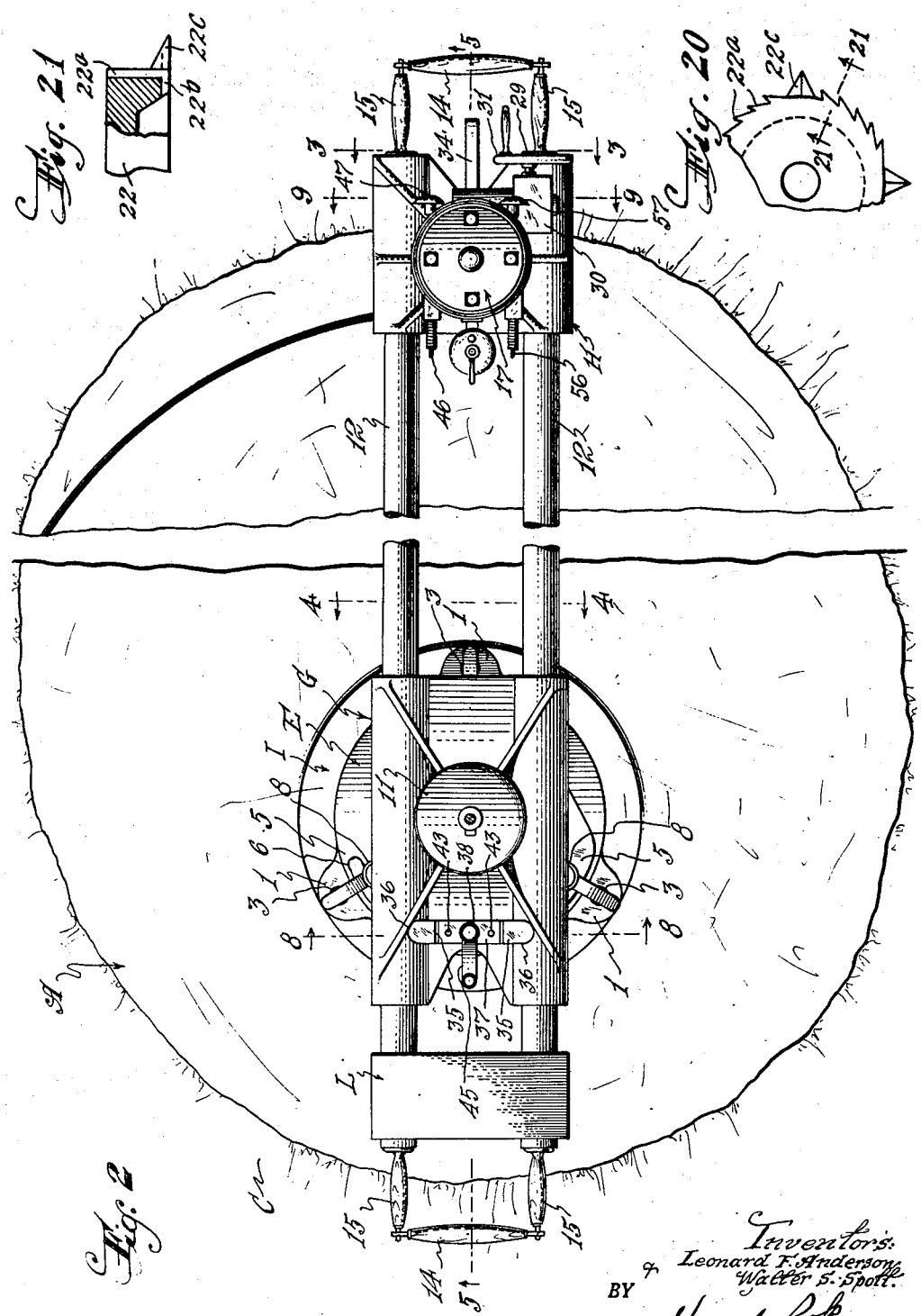

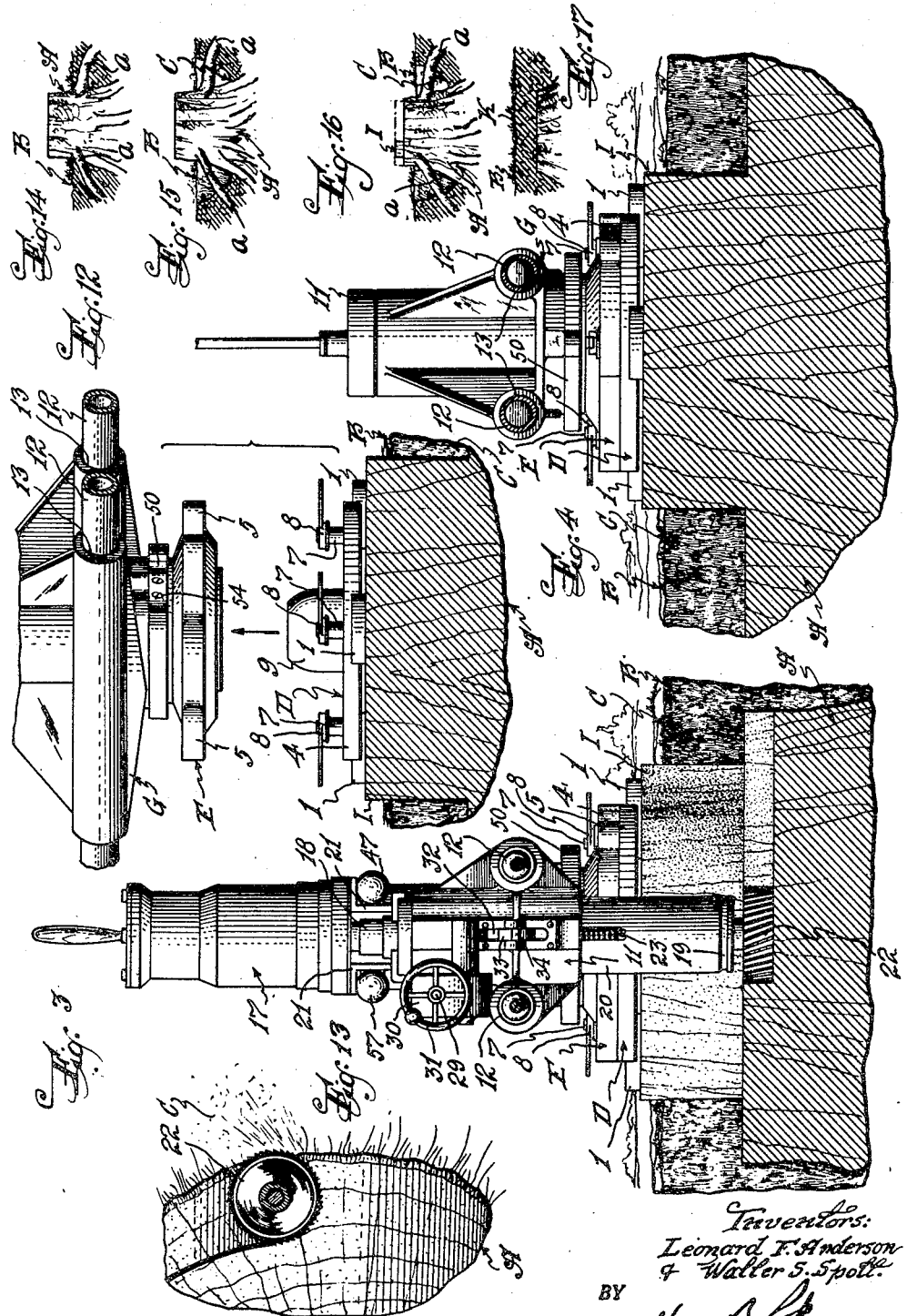

March 9, 1954 L. F. ANDERSON ET AL 2,671,478
APPARATUS FOR CUTTING STUMPS
Filed March 16, 1949 5 Sheets-Sheet 4
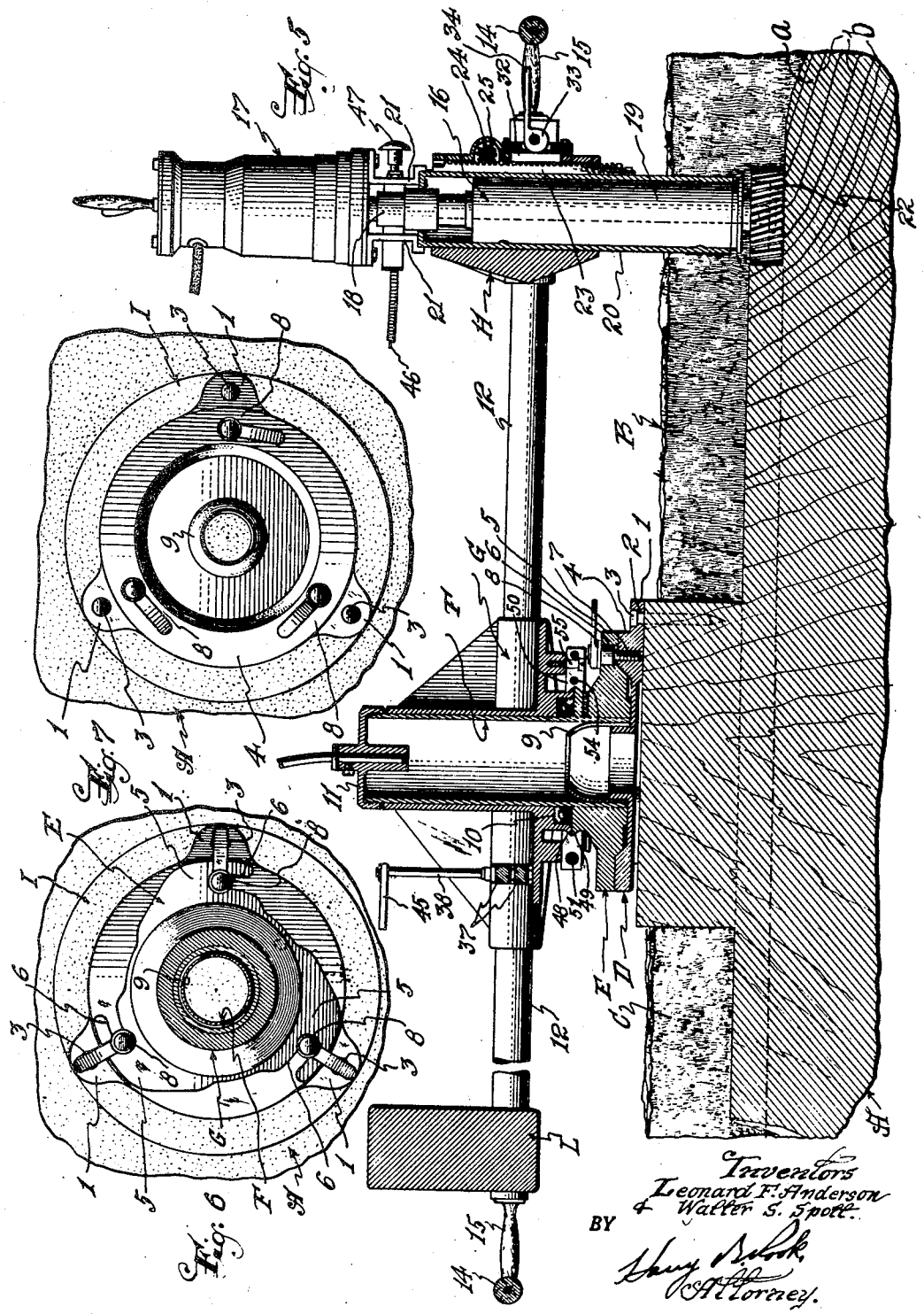
Inventors
Leonard F. Anderson
& Walter S. Spott
BY
Attorney

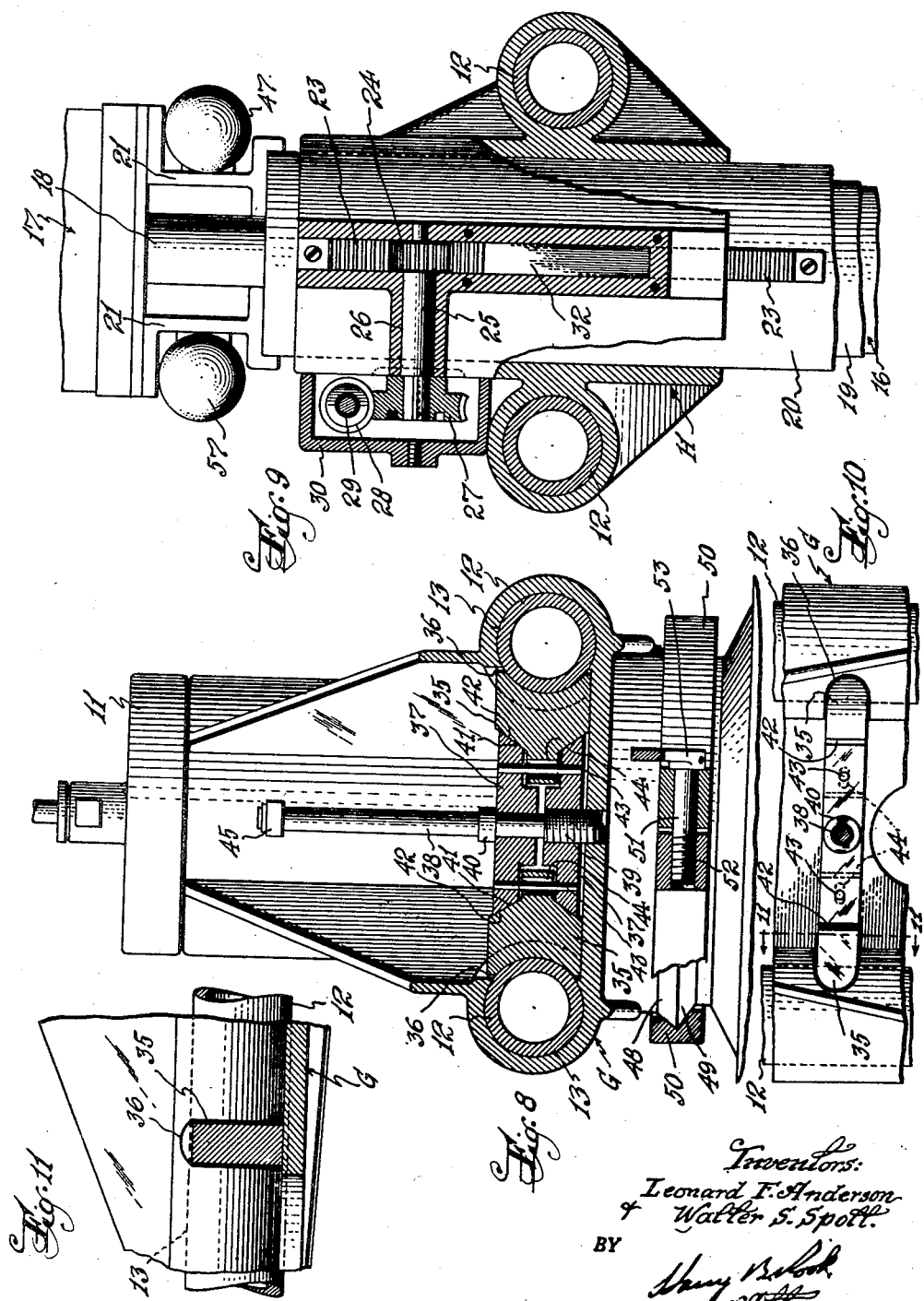

Patented Mar. 9, 1954

2,671,478

UNITED STATES PATENT OFFICE 2,671,478

APPARATUS FOR CUTTING STUMPS

Leonard F. Anderson and Walter S. Spott,
Verona, N. J.

Application March 16, 1949, Serail No. 81,706

3 Claims. (Cl. 144—2)

This invention relates particularly to a machine for cutting away a tree stump to a point substantially below the surface of the surrounding earth so that the stump may be covered with earth. According to common practice, tree stumps are removed by sawing the stump as far as possible and then digging and chopping out the stump, which is a laborious, time-consuming and unsatisfactory method. The removal of the stump is complicated by the large lateral roots that are usually located just below the ground level, and it has heretofore been thought to be necessary to remove these lateral roots by individually chopping or sawing them.

Our invention contemplates the cutting away of the main portion of the stump as well as the lateral roots in a continuous cutting action with a rotary cutter so as to obviate the necessity for chopping and sawing, and one object of the invention is to provide a novel and improved method and apparatus for the purpose described whereby a stump may be cut away in successive horizontal layers so as to leave the stump with a substantially smooth horizontal surface at a substantial distance below the ground level.

Another object of our invention is to provide a machine which shall include a motor driven rotary cutter mounted on a suitable support, for example, a motor truck body or upon the stump itself, so that the cutter can be swung horizontally transversely of the stump to remove layers of wood of predetermined thickness from the stump.

A further object is to provide a stump cutting machine of this character which shall also include novel and improved means for adjusting the cutter vertically, whereby successive horizontal layers of the stump can be removed.

Other objects are to provide a relatively inexpensive stump cutting machine which shall be simple to operate, shall be reliable and durable and by which a stump can be cut away rapidly and neatly; and to obtain other advantages and results that will be brought out by the following description in conjunction with the accompanying drawings, in which:

Figure 1 is a side elevational view of a stump cutting machine embodying the invention, showing the machine mounted on a stump which has been cut away to a point substantially below the ground level;

Figure 2 is a top plan view of the machine mounted on the stump;

Figure 3 is an end elevational view of the machine;

Figure 4 is a transverse vertical sectional view, approximately on the plane of the line 4—4 of Figure 2;

Figure 5 is a vertical longitudinal sectional view through the machine, approximately on the plane of the line 5—5 of Figure 2;

Figure 6 is an enlarged horizontal sectional view, approximately on the plane of the line 6—6 of Figure 1;

Figure 7 is a top plan view of the base of the machine;

Figure 8 is an enlarged fragmentary transverse vertical sectional view, approximately on the plane of the line 8—8 of Figure 2;

Figure 9 is a fragmentary transverse vertical sectional view, approximately on the plane of the line 9—9 of Figure 2;

Figure 10 is a fragmentary top plan view of the guide bar locking mechanism;

Figure 11 is a fragmentry sectional view, approximately on the plane of the line 11—11 of Figure 10;

Figure 12 is a composite side elevational view of the base and main support of the machine in separated relation and with portions broken away and shown in section;

Figure 13 is a fragmentary horizontal sectional view, approximately on the plane of the line 13—13 of Figure 1;

Figures 14–17, inclusive, are schematic sectional elevations showing the condition of a tree stump at successive steps in the removal thereof by the machine of the invention;

Figure 18 is a side elevational view of an adaptor base for mounting the machine to permit removal of the pedestal of the stump on which the machine was initially mounted;

Figure 19 is a top plan view of the adaptor base and stump shown in Figure 18;

Figure 20 is a fragmentary enlarged top plan view of one form of rotary cutter that may be used in the machine, and Figure 21 is a fragmentary sectional elevational view, approximately on the plane of the line 21—21 of Figure 20.

The invention contemplates the mounting of the machine upon any suitable support, such as the body of a motor truck or directly upon the stump, but for the purpose of illustrating the principles of the invention we have shown the machine especially constructed for mounting thereof upon the top of a stump.

Specifically describing the illustrated embodiment of the invention, the reference character A designates a tree stump which initially is in the condition schematically illustrated in Figure 14 with an approximately horizontal and smooth top surface a few inches above the ground level B and having lateral roots *a* disposed close to the ground level as is common. As shown, the wood grain of these lateral roots, which is indicated by the lines *b*, extends angularly with respect to the main portion of the stump, sometimes almost horizontally, as shown in Figures 1 and 2, and it is extremely difficult to cut the wood of these lateral roots. Heretofore, it has been customary to either saw or chop the lateral roots transversely or in planes approximately perpendicular to the length of the roots.

In accordance with the present embodiment of the invention, the first step in the cutting away of the stump is to excavate the earth surrounding the tree stump to a point below that to which it is desired to lower or cut away the top surface of the stump, as indicated at C in Figure 15. Then the base D of the machine is mounted on the stump, either near the center thereof if the stump is large enough or at any convenient place near the periphery of the stump.

The base D comprises a casting having radial foot lugs 1 provided with openings 2 through which may be driven screws or spikes 3 for firmly mounting the base on the upper surface of the stump.

The top of the base has an annular seat 4 for a bearing support plate E coaxially of which is mounted a bearing column F for a main support casting G. As shown, the column support plate E has radial lugs 5 each of which has an arcuate notch 6 opening through one edge thereof concentrically with the plate E; and the base D has a clamping screw 7 threaded therein for each lug and provided with a clamping head 8. With this construction, the plate E may be rigidly secured on the base D by rotating the plate E relatively to the base so that one of the clamping screws 7 is disposed in each of the notches 6, and thereafter tightening the clamping heads 8 against the plate.

To facilitate the fitting of the column support plate E and the column F upon the base D, the base may have an upstanding guide post 9 formed with a segmentally spherical upper end, as best shown in Figures 5 and 7.

The main support casting G is mounted to rotate about a vertical axis on the column F and is supported on the support E by a thrust ball bearing 10. A cap 11 is secured to the upper end of the column to hold the main support thereon. The support casting G carries a guide-support frame comprising two guide rods 12 one of which is horizontally slidably mounted at each side of the axis of rotation of the casting in a guide opening 13 in the support casting G, and the guide rods have push-pull handles 14 at their opposite ends for sliding the rods horizontally. Also, lift-handles 15 are provided at the ends of the guide rods for lifting them, the main support G and the support plate E during application and removal of the support plate and column to and from the base D, respectively.

At one end of the guide rods 12 is a support H for a vertical cutter spindle 16 and a high speed electric motor 17 which drives said spindle at high speed, for example, from 5,000 to 10,000 R. P. M. The spindle is connected to the drive shaft of the motor 17 by any suitable coupling means generally designated 18, and is mounted in a suitable bearing 19 which is in turn secured in a housing 20. The motor 17 is mounted on the upper end of the housing 20 above the support H by an intermediate bracket 21; and a suitable cutter 22, for example as shown in Figures 1, 13, 20 and 21, is mounted on the lower end of the spindle 16 below the support H. Preferably, a counterbalance L for the motor and its associated parts is mounted on the guide rods at the side of the column F opposite the motor support.

In accordance with the invention, the cutter is vertically adjustable so that successive cuts at different elevations may be taken from the stump, and as shown, the housing 20 has a rack bar 23 secured thereon and meshing with a pinion 24 which is mounted on a stub shaft 25 which is in turn journaled in a bearing boss 26 mounted on or forming a part of the support H. The stub shaft is rotatable by a worm gear 27 which meshes with a worm 28 mounted on a shaft 29 which is journaled in a housing 30 secured to the support H. A hand-wheel 31 is mounted on the shaft for rotating the latter to raise or lower the spindle housing 20 for proper adjustment of the cutter 22. For locking the spindle housing in its adjusted positions, a clamping block 32 is arranged in the support H for frictional engagement with the rack bar, and a manually operated cam 33 is provided for forcing the clamping bar 32 into or releasing it from engagement with the rack bar. The cam 33 has a finger-lever 34, and obviously by pressing downwardly on the finger-lever (see Figure 5), the clamping bar 32 will be forced into tight engagement with the rack bar to hold the spindle housing against vertical movement in the support 8.

With this construction, it will be observed that when the machine is mounted on the stump as shown in Figures 1-3, inclusive, the operator or operators may grip one or both of the push-pull handles 14 so as to locate the cutter at the desired horizontal location on the stump, and then the spindle housing 20 may be raised or lowered to locate the cutter at the desired elevation. Then, upon starting of the motor 17 the cutter may be pulled or pushed by one of the pull handles 14 into engagement with the stump, as shown in Figure 5, and at the same time the guide bars 12 may be swung about the axis of the column F so as to move the cutter in an arcuate path, as best shown in Figures 2 and 13. After the cutter has been swung across the stump or has made a complete rotation about the axis of the column F where the stump is large enough, the cutter is again adjusted vertically and horizontally for another cut. This is continued so that successive layers are removed until the upper surface of the stump is disposed the desired distance below the ground level B.

It is desirable that means be provided for positively locking the guide rods 12 against longitudinal movement during the cutting operation, and for this purpose we have shown two clamping jaws 35, one to frictionally engage each of the guide rods through a slot 36 in the main support, said jaws being movable from and toward each other into and out of engagement with the respective guide bars, respectively, by two actuating blocks 37 that are movable toward and from each other by an actuating rod 38 which is screw-threaded at 39 in one of the blocks and has a collar 40 to abut the other block, so that upon rotation of the rod in opposite directions, said blocks will be moved toward and from each other, respectively. The blocks have beveled surfaces 41 at their ends to engage correspondingly beveled surfaces 42 on the jaws 35 so that when the blocks are moved toward each other said beveled surfaces cooperatively engage to force the blocks into engagement with the guide rods. The jaws are held against displacement from the blocks by guide pins 43 mounted in the blocks 37 and passing through slots 44 in the jaws. The shaft 38 may be operated in any suitable manner, but preferably has an arm 45 at its upper end which is connected by a Bowden wire 46 to a reciprocating handle 47 mounted in the intermediate bearing bracket 21 beneath the motor 17.

It is also desirable that means be provided for positively locking the main support G against rotation on the column at certain times, for example, during adjustment of the cutter, and for this purpose we have shown frusto-conical brake surfaces 48 and 49 on the support casting and the support plate E, respectively, and brake shoes 50 encircle said brake surfaces and are actuatable into and out of engagement with both thereof by an actuating screw 51 which is screw-threaded at 52 in one of the shoes and has a head 53 abutting the other so that upon rotation of said screw in opposite directions the shoes are moved into and out of engagement with the brake surfaces, respectively. As shown, the brake shoes are approximately semi-circular and one end of each is shown as loosely connected to the corresponding end of the other by bolts 54, and both shoes are pivotally mounted at one end on the main support by a pivot screw 55. The actuating screw 51 may be actuated in any suitable manner, but preferably the head 53 is in the form of an arm which is connected by a Bowden wire 56 to a reciprocable handle 57 mounted on the bracket 21 adjacent the handle 47.

It will be observed that after the stump has been cut away to the desired point below ground level, a column or boss I will be left on the top of the stump with the machine mounted on the top thereof. This boss may be removed in any suitable manner, for example, by chopping or sawing, but we may utilize an adaptor base J which is of approximately the same height as the boss I and has foot lugs 58 for securing it to the upper surface of the stump at one side of the boss in the same manner in which the main base D is shown as secured to the stump in Figures 1–5, inclusive, as shown in Figures 18 and 19. At its top side the adaptor base has other lugs 59 on which the main base D of the machine may be secured by suitable fastening means such as bolts 60. After the machine has been mounted on the adaptor base, the cutter may be adjusted and operated to cut away the boss I.

After the boss has been removed, the stump may be covered with a layer of earth, designated K in Figure 17, which may be of sufficient depth for planting.

The rotary cutter is constructed to cut at both its periphery and its bottom edge, and as shown, has vertical or longitudinal cutting edges 22a on its periphery and similar cutting edges 22b at the edge of its bottom side. In some cases, it may be desirable to provide a plurality of circumferentially spaced pointed teeth 22c at the juncture of the periphery and the bottom side of the cutter. Such teeth are particularly advantageous at the juncture of the lateral roots a and the main portion of the stump to cut through the curved or diagonally arranged grain of the wood.

It is desirable that the cutter be of a diameter of about three and one-fourth (3¼) inches and of a thickness of about one and one-fourth inches (1¼), and as best shown in Figure 13, the cutter engages the wood throughout nearly half the circumference of the cutter so as to cut a rabbet or groove of a width somewhat less than the diameter of the cutter.

With our method and machine, a stump can be cut away with surprising rapidity and facility and portions of the lateral roots a may be horizontally cut away in one continuous operation with the cutting of the main portion of the stump, as shown in Figures 1 and 2. Therefore, with our invention, it is possible to quickly and neatly cut away a stump to a point many inches below the ground level without the laborious, crude and time-consuming chopping, chiseling or sawing of the stump.

Preferably, a mast or rod M is secured in the cap 11 of the support column F to which the electrical supply cable N for the motor 17 may be clamped or tied, whereby said cable may be held in an out-of-the-way position.

While we have shown and described the invention as embodied in certain specific details of construction, it should be understood that this is primarily for the purpose of illustrating the now preferred form of the invention and that many modifications and changes may be made in the construction of the machine within the spirit and scope of the invention.

Having thus described the invention, what we claim is:

1. A machine for cutting tree stumps while the latter are vertically disposed in the ground, said machine comprising a base having bearing surfaces to seat on the horizontal top surface of a stump and having openings to receive fastener elements to be driven into said top surface of the stump, a support plate, means for separably clamping said support plate upon said base, a cutter, a main support including an element mounted on said support plate to rotate about a vertical axis, guide rods mounted in said element for horizontal movement relatively to said element and projecting from said element at opposite sides of said axis, mounting means for said cutter on said guide rods at one side of said axis to swing horizontally with said guide rods, means for vertically adjusting said cutter in said mounting means, a motor on said mounting means and a direct driving connection between said motor and said cutter.

2. A machine for cutting tree stumps that are disposed in vertical position in the ground, said machine comprising a base, means to fasten said base on a horizontal support, a support plate, means for separably clamping said support plate upon said base, a cutter, a main support including an element mounted on said support plate to rotate about a vertical axis, a pair of guide rods slidably mounted for horizontal movement in said element, means mounting said cutter on said guide rods at one side of said axis of rotation to swing with said guide rods, a motor on said mounting having a vertical shaft, a direct driving connection between said motor shaft and said cutter providing for movement of said cutter vertically and longitudinally of said shaft, and mechanism in said mounting means for so vertically adjusting said cutter.

3. A machine for cutting tree stumps while the latter are vertically disposed in the ground, said machine comprising a base having a bearing support on one side and having bearing surfaces on another side to seat on the horizontal surface of a support for the base and having openings to receive fastener elements to be driven into said horizontal surface, a cutter, a main support for said cutter rotatably mounted on said bearing support to swing said cutter horizontally, means mounting said cutter on said main support for movement horizontally relatively to said main support, means on said main support for vertically adjusting said cutter, means on said main support for driving said cutter, and means for releasably locking said main support against rotation on said base, the last-named means including brake-surfaces on said main support and said bearing support coaxial with said axis of rotation of said main support, brake shoes to engage and disengage both said brake-surfaces and means for actuating said brake shoes.

LEONARD F. ANDERSON.
WALTER S. SPOTT.

References Cited in the file of this patent

UNITED STATES PATENTS

| Number | Name | Date |
|---|---|---|
| 676,197 | Mill | June 11, 1901 |
| 932,449 | Dempsey | Aug. 31, 1909 |
| 1,040,419 | Rightmire | Oct. 8, 1912 |
| 1,273,043 | Densmore | July 16, 1918 |
| 1,517,073 | Kent | Nov. 25, 1924 |
| 1,524,007 | Adair | Jan. 27, 1925 |
| 1,559,926 | Adair | Nov. 3, 1925 |
| 1,565,927 | Green | Dec. 15, 1925 |
| 1,836,457 | Emmons | Dec. 15, 1931 |
| 1,895,054 | Steinmeyer | Jan. 24, 1933 |